US012724270B2

(12) United States Patent
Lai et al.

(10) Patent No.: US 12,724,270 B2
(45) Date of Patent: Sep. 1, 2026

(54) OPTICAL ASSEMBLY FOR HEAD WEARABLE DISPLAYS

(71) Applicant: HES IP HOLDINGS, LLC, Austin, TX (US)

(72) Inventors: Jiunn-Yiing Lai, New Taipei City (TW); Yu-Chieh Cheng, Taipei City (TW); Ken-Yu Cheng, Taichung City (TW); Guo-Hsuan Chen, Taichung City (TW); Feng-Chun Yeh, Taipei City (TW); Tai-Kuo Chen, New Taipei City (TW)

(73) Assignee: Oomii Inc., Grand Cayman (KY)

( * ) Notice: Subject to any disclaimer, the term of this patent is extended or adjusted under 35 U.S.C. 154(b) by 320 days.

(21) Appl. No.: 18/291,511

(22) PCT Filed: Feb. 23, 2023

(86) PCT No.: PCT/US2023/013719
§ 371 (c)(1),
(2) Date: Jan. 23, 2024

(87) PCT Pub. No.: WO2023/164065
PCT Pub. Date: Aug. 31, 2023

(65) Prior Publication Data

US 2024/0345398 A1 Oct. 17, 2024

Related U.S. Application Data

(60) Provisional application No. 63/435,030, filed on Dec. 23, 2022, provisional application No. 63/313,741, filed on Feb. 25, 2022.

(51) Int. Cl.
*G02B 27/01* (2006.01)
*G02B 1/00* (2006.01)

(52) U.S. Cl.
CPC ......... *G02B 27/0172* (2013.01); *G02B 1/002* (2013.01); *G02B 2027/011* (2013.01);
(Continued)

(58) Field of Classification Search
CPC ................ G02B 27/0172; G02B 1/002; G02B 2027/011; G02B 2027/0116; G02B 2027/0134; G02B 3/0056
(Continued)

(56) References Cited

U.S. PATENT DOCUMENTS 10,502,870 B2 * 12/2019 Le Gros ................ G02B 13/22
2005/0152426 A1 * 7/2005 Dell'Acqua .......... H01S 3/0941
372/69
(Continued)

FOREIGN PATENT DOCUMENTS

CN 110515215 A 11/2019
CN 112630868 A 4/2021
(Continued)

OTHER PUBLICATIONS

International Search Report in the related PCT application No. PCT/US23/013719 dated Jun. 1, 2023.
(Continued)

*Primary Examiner* — Mohammed A Hasan
(74) *Attorney, Agent, or Firm* — Chen Yoshimura LLP

(57) ABSTRACT

An optical assembly for head wearable display includes a light redirecting layer, provided in a first optical path between a first light emitter and a first eye of a viewer, the light redirecting layer including a plurality of three dimensional geometric patterns that are cyclically provided on one surface of the light redirecting layer. The light redirecting layer includes a plurality of subunit sections, each of the plurality of subunit sections respectively includes the plurality of three dimensional geometric patterns with different
(Continued)

physical dimensions for respectively receiving and redirecting light emission of different wavelengths of a first light signal emitted by the first light emitter toward the first eye of the viewer with different incident angles, the first light signal corresponds to a first pixel of an image. The plurality of three dimensional geometric patterns include pillar like three dimensional nanostructure protruding from a surface of the light redirecting layer.

19 Claims, 11 Drawing Sheets

(52) U.S. Cl.
CPC ................. *G02B 2027/0116* (2013.01); *G02B 2027/0134* (2013.01)

(58) Field of Classification Search
USPC .......................................................... 359/630
See application file for complete search history.

(56) References Cited

U.S. PATENT DOCUMENTS

2016/0306079 A1* 10/2016 Arbabi ................. G02B 5/0268
2019/0137762 A1* 5/2019 Hu ....................... G02B 27/144
2019/0227316 A1 7/2019 Lee et al.
2020/0135703 A1 4/2020 Ahmed et al.
2020/0209629 A1 7/2020 Suzuki et al.
2021/0044748 A1* 2/2021 Hu ......................... G02B 1/002
2021/0405255 A1* 12/2021 Kress ..................... G02B 1/002

FOREIGN PATENT DOCUMENTS

CN 113589535 A 11/2021
CN 113640992 A 11/2021
TW 201624442 A 7/2016
TW 201932959 A 8/2019
WO 2021196790 A1 10/2021
WO 2021/258078 A1 12/2021
WO 2023/278465 A1 1/2023

OTHER PUBLICATIONS

Taiwanese Office Action, dated Mar. 18, 2024, in a counterpart Taiwanese patent application, No. TW 112106963.
Extended European Search Report dated Jun. 30, 2025 in a counterpart European patent application, No. EP 23760648.8.
Chinese Office Action, dated Apr. 23, 2026 in a counterpart or related Chinese patent application, No. CN 202380012722.6.

* cited by examiner

1st subunit section
2nd subunit section

| | | | | | |
|---|---|---|---|---|---|
| RG | RG | RG | RG | RG | RG |
| BB | BB | BB | BB | BB | BB |
| RG | RG | RG | RG | RG | RG |
| BB | BB | BB | BB | BB | BB |
| RG | RG | RG | RG | RG | RG |
| BB | BB | BB | BB | BB | BB |
| RG | RG | RG | RG | RG | RG |
| BB | BB | BB | BB | BB | BB |

R
G
B
R
G
B
R
G
B
R
G
B

OPTICAL ASSEMBLY FOR HEAD WEARABLE DISPLAYS

RELATED APPLICATION

The preset application claims the benefit of the U.S. provisional application No. 63/313,741, filed on Feb. 25, 2022, titled "OPTICAL COMBINER WITH META-SURFACE FOR HEAD WEARABLE DISPLAY DEVICE" and U.S. provisional application No. 63/435,030, filed on Dec. 23, 2022, titled "DEVELOPMENT OF THE OPTICAL COMBINER WITH META-SURFACE FOR HEAD WEARABLE DISPLAY DEVICE".

BACKGROUND OF THE INVENTION

Field of the Invention

The present invention relates to an optical assembly for rendering virtual images for head wearable displays such as augmented reality or mix reality displays; more specifically, the present invention discloses optical assembly incorporating meta-surface for enhancing the performance of virtual image rendering capability in head wearable displays.

DESCRIPTION OF RELATED ART

Most of the current head wearable displays such as augmented reality glasses or virtual reality glasses implement conventional optical assembly for directing light emitted by the light emitter into the viewer's eyes. For controlling the direction of the light, the curvature of the surface of the optical assembly is modified to alter the direction of light reflected by the optical assembly. There is very few other means to influence the optical performance of the optical assembly beside modifying the curvature of the surface of the optical assembly, as well as other optical elements. Virtual image rendered by the conventional optical assembly oftentimes suffers distortion and field of view limitation.

Meanwhile, meta-surface, also known as artificial impedance surface, is known for its ability to manipulate and control the behavior of electromagnetic waves. It has been the subject of intense research and development in recent years due to their potential applications in a wide range of fields, including telecommunications, optics, and biomedicine. By carefully designing the electrical and magnetic properties of a meta-surface, it is possible to manipulate the behavior of an incoming electromagnetic wave in a predictable and controllable manner.

One of the key benefits of meta-surfaces is their ability to redirect and control the direction of electromagnetic waves in a highly efficient manner. This can be achieved by designing the meta-surface to have a specific impedance profile, which will cause the incoming wave to be redirected in a specific direction. This property has important implications for a wide range of applications, including the development of optical lenses for head wearable devices.

Over the past few years, there has been significant progress in the development of head wearable display (e.g., glasses) for augmented reality (AR) environment. Despite this, there are still several challenges that need to be overcome. One of the biggest technical challenges for AR glasses is miniaturization. AR glasses require complex hardware components, including displays, cameras, sensors, and processors, to be incorporated into a compact form factor. Particularly, the optical components of the AR glasses plays a big role in terms of the performance and the overall form factor of the AR glasses. Meta-surfaces have the potential to have a major impact in the field of head wearable device. However, there has been very few development with regard to the application of meta-surfaces in the field of AR glasses as meta-surfaces post the possibility for resolving the issues of image distortion, field of view, form factor, eye relieve, volume reduction.

SUMMARY

The present invention discloses an optical assembly for head wearable display for displaying augmented reality, mix reality, and virtual reality environment. The optical assembly implement meta-surface for enhancing optical performance.

In one embodiment, the present invention discloses a process flow for designing meta-surface with the desirable optic performance for the optical assembly in accordance with the present invention:

Step 1: transform the input light and output light into tensors; transform the desired output light needed into susceptibility tensor;

Step 2: define key parameters for calculation, the parameters may be:

1. Wavelength of the red, green, and blue light emitted by the light emitter of the head wearable display;
2. The transmitting rate of the environment visible light to the optical assembly having meta-surfaces;
3. The light profile of light emitted by the light emitter, for examples, shape and area of the cross-section of the light beam emitted by the emitter of the head wearable display;

Step 3: determine the appropriate calculation model and characterize the parameters;

Step 4: perform computer assisted calculation with models to determine the optimized geometry of the three dimensional geometric patterns of the meta-surface in a unit area corresponding to the desired final light profile; determine the profiles (the shape, dimension, rotational angle and distance between adjacent meta-surfaces . . . etc.) of the three dimensional geometric patterns across a predetermine area of the meta-surface based on linear estimation.

The three dimensional (3D) meta-structure in accordance with the present invention is specially designed so it is compatible with the 3D image rendering method utilized by the head wearable display. The 3D nanostructure on meta-surface are pillar like structures with a varieties of cross sectional shape, such as circle, ellipse, and rectangle . . . etc. The meta-surface is divided into a plurality of subunit sections; where each subunit section is responsible for changing the direction of a light signal forming a pixel of the binocular virtual image.

According to one embodiment of the present invention, the layout of the subunit sections and different areas for receiving different colors of lights are shown in the figure. In this embodiment, a cross sectional area of the light signal projected on the light redirecting layer is substantially the same as an area of one of the subunit sections. Each of the plurality of subunit sections comprises a first area B for receiving and redirecting the blue light, a second area G for receiving and redirecting the green light, or a third area R for receiving and redirecting the red light. However, upon receiving the light with different wavelengths, the first section B, the second section G, and the third section R redirect the light with different wavelengths to a same position on a retina of the first eye of the viewer. Thereby, the accurate color representation of the pixel can be reconstructed and received by the viewer. Notice that in some embodiments, two of the first area B, the second area G, and the third area R have a same horizontal position relative to the light redirecting layer, one of the first area B, the second area G, and the third area R is horizontally or vertically displaced from the other two.

According to one embodiment of the present invention, a cross sectional area of the light signal projected on the light redirecting layer may be larger than the area of one of the subunit sections. Each of the subunit sections is spaced apart from its neighboring subunit sections.

According to one embodiment of the present invention, a subunit section may be sharing a same first area G, second area B, or third area R with another neighboring subunit section. As shown in the figure, a first subunit section is marked as a square and a second subunit section is marked as a square with bolded lines. Both the first subunit section and the second subunit section share the same first area G second area. In this case, the cross sectional area of the light signal projected on the light redirecting layer may be substantially the same as the area of the subunit sections. With this arrangement, the total area of the meta-surface can be reduced, which in turn reduce the manufacturing cost of the meta-surface.

Alternatively, in another embodiment of the present invention, each of the plurality of subunit sections may comprise a first area R&G for receiving and redirecting two colors of light at once, and a second area B for receiving and redirecting the remaining color of light. In this embodiment, a single set of three dimensional nanostructure may be used for receiving two colors of light which have closer wavelengths. For example, the single set of three dimensional nanostructure may be used for receiving and redirecting red and green light, while a separate set of three dimensional nanostructure may be needed for receiving and redirecting blue light. In this manner, by reducing the number of sections for receiving different colors of light within the subunit section, the manufacturing process of the three dimensional nanostructure may be simplified. However, similar to the previous embodiments, upon receiving the light with different wavelengths, the first section R&G, and the second section B redirect the light with different wavelengths to a same position on a retina of the first eye of the viewer.

Yet in another embodiment of the present invention, each of the plurality of subunit sections may comprise a first area G&B for receiving and redirecting two colors of light at once, and a second area R for receiving and redirecting the remaining color of light.

In some embodiments, the light signal emitted by the light emitter may be uniformly received by a subunit section. In some other embodiments, each color contained in one single light signal may be respectively projected to different areas of the subunit sections. In order for different areas on the subunit section to receive the corresponding color of light, the light emitter may need to be purposely configured accordingly.

In some embodiments, the optical assembly may be implemented with dioptric power so viewer with myopia, hyperopia, or likes may be able to see the real object in the environment. The dioptric surface may comprise a convex surface or concave surface. The curvature of one of the surfaces of the dioptric surface is determined based on the viewer's dioptric prescription. If the optical assembly is integrally formed, the prescribed curvature may be the outer surface of the optical assembly. The inner surface of the optical assembly may be provided with light redirecting layer having the meta-surface for directing the light signal to the eyes of the viewer.

The head wearable displays implemented optical assembly having meta-surface may have the following advantages over the conventional head wearable displays:

1. Expanded field of vision (FOV): meta-surface of the optical assembly can be engineered such that the NA (Numerical Aperture) can be increased relative to conventional optical assembly. For example, the conventional optical assembly may have NA less than 0.5; on the other hand, the optical assembly having meta-surface may have NA that reaches 0.9. Furthermore, the FOV of the optical assembly can be changed from less than 40 degrees to greater than 80 degrees, with the implementation of meta-surface. In some instances, the optical assembly having meta-surface can achieve negative refraction rate, which is not possible in the conventional optical assembly.
2. Shorten eye relief: the phrase "eye relief" refers to the distance between the eyeglasses (or optical assembly) and the pupil. The fact that conventional head wearable displays with conventional optical assembly have poor NA performance affects eye relief. Typically, the eye relief of conventional head wearable displays may be 2.5 cm or more. However, with optical assembly having meta-surface, eye relief may be less than 1.5 cm.
3. Reduced volume and weight: with optical assembly having meta-surface, the volume and weight of the head wearable display can be reduced since fewer conventional optical elements may be required for rendering virtual image.
4. Better aesthetic design (form factor): conventional head wearable displays are bulky due to the fact that they require larger eye relief. With decreased eye relief, the form factor of the head wearable device implementing optical assembly having meta-surface can be closer to traditional eyeglasses.
5. Less image distortion: conventional optical assembly and optical elements in the head wearable device may create different optical path length for light with different wavelength from the light emitter or light having different incident angles. As a result, the shape of the final image frame projected into the viewer's eye may appear to be distorted. The distortion can be corrected with meta-structure such that the final image rendered in the viewer's eyes is not distorted.

DETAILED DESCRIPTION OF PREFERRED EMBODIMENTS

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section.

Figure 1:
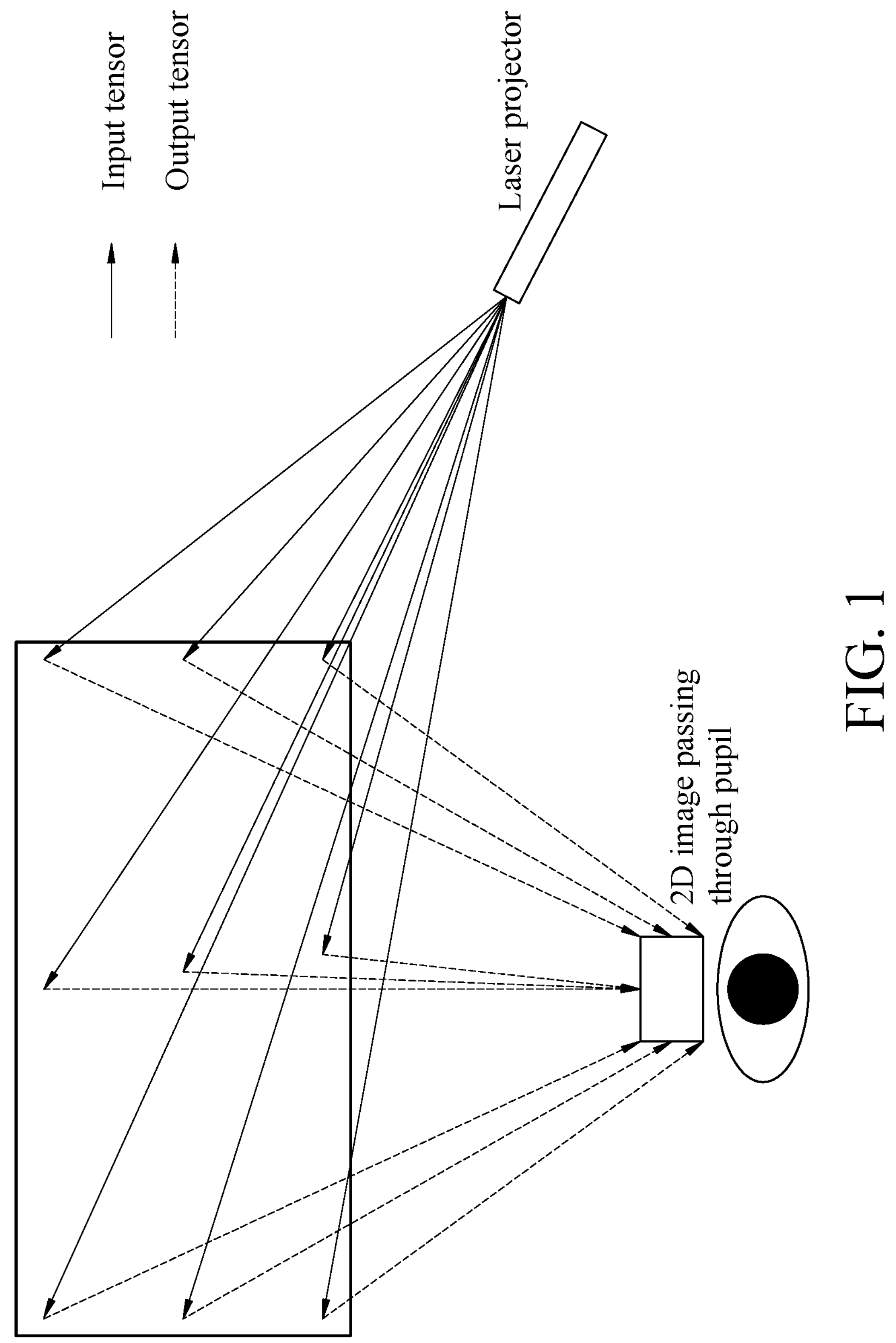
FIG. 1 illustrates the input tensor and output tensor for constructing the meta-structure of the present invention

With regard to designing the suitable meta-structure on a meta-surface having the above mentioned advantages and optical functionalities (and suppose the final meta-surface has a desired rectangular shape) for the optical assembly in head wearable displays, a number of points (e.g., total of nine points) on the meta-surface are used as anchor for meta-surface design. With reference to FIG. 1, the light outputs from these points are used to check whether the light profile of these light outputs fulfill the desired specification (e.g., intensity, incident angle, spot size . . . etc.) for rendering virtual image for the head wearable display. As an example, an optical combiner with meta-surface embedded thereon having a dimension of 20×11.25 mm may correspond to a frame of virtual image having resolution of 1280×720 pixels. The dimension of the frame of the virtual image is scaled down to 2×1.125 mm when reaching the pupil of the viewer. When the light profile of the light output from all nine anchor points of fulfill the desired requirements, the specifications (the shape, dimension, rotational angle and distance between adjacent meta-surfaces . . . etc.) of the meta-surface for the intermediate area between these nine anchor points can be determined by using linear estimation. The effect of meta-surface on the input light from the environment is checked for ensuring the transparency of the optical assembly and the meta-surface for the environment lights. The specifications of the meta-surface are modified if necessary.

Image distortion is caused by different refraction rate experienced by light having different wavelengths (red, green, and blue light), as well as by various light paths experienced by light having different incident angles while passing through various optical elements. With meta-surface, the light profile can be modified such that the intensity distribution and the shape of the image can be corrected with the meta-surface when the image is formed on the retina of the viewer. In some instances, meta-surface engineering starts with using the distorted image as an input tensor, while image with correct shape and uniformity is used for output tensor for determining anti-distortion susceptibility tensors.

In some cases, it may be necessary to reform the spot size and/or shape (which is the cross-sectional area and shape of the light) of the light emitted by the light emitter. As an example, in the case which it is a light signal with oval cross-sectional shape needs to be change to a circular shape, the corresponding meta-surface capable of correcting an oval shaped light profile can be obtained by setting the oval shaped light profile as the input tensor and the circular shaped light profile as the output tensor. The calculation can also use 9 anchor points (or just 5 anchor points) to linearly estimate the meta-surface for the remaining portions of the meta-surface.

The following describes the general process flow for designing meta-surface with the desirable optic performance for the optical assembly in accordance with the present invention:

Step 1: transform the input light and output light into tensors; transform the desired output light needed into susceptibility tensor;

Step 2: define key parameters for calculation, the parameters may be:

1. Wavelength of the red, green, and blue light emitted by the light emitter of the head wearable display;
2. The transmitting rate of the environment visible light to the optical assembly having meta-surfaces;
3. The light profile of light emitted by the light emitter, for examples, shape and area of the cross-section of the light beam emitted by the emitter of the head wearable display;

Step 3: determine the appropriate calculation model and characterize the parameters;

Step 4: perform computer assisted calculation with models to determine the optimized geometry of the three dimensional geometric patterns of the meta-surface in a unit area corresponding to the desired final light profile; determine the profiles (the shape, dimension, rotational angle and distance between adjacent meta-surfaces . . . etc.) of the three dimensional geometric patterns across a predetermine area of the meta-surface based on linear estimation.

The present discloser implements meta-surface on the optical assembly of the head wearable display, however, a person having ordinary skill in the art may also know how to apply meta-surface on various optical elements of the head wearable display based upon the teaching of the present discloser. The following describes several possible ways of the implementations of meta-surface in head wearable displays.

1. Optical assembly: meta-surface may be applied to the optical assembly as an optical film for modifying the optical property of the optical assembly and altering the optical path of the light.
2. Correction for image distortion: meta-surface may be implemented on at least one of the optical elements of the head wearable display for compensating the distortion of the image so the final image may appear to be the desired shape (e.g., rectangular shaped).
3. Chromatic aberration correction: the meta-surface may be implemented on at least one of the optical elements of the head wearable display for aberration correction of the image.
4. Improving uniformity of light intensity distribution: the optical path difference among the plurality of light signals causes the light intensity of each of the plurality of light signals to be different when reaching the eyes of the viewer; the meta-surface may be implemented on at least one of the optical elements of the head wearable display for optical path correction among the plurality of light signals.

5. Light beam cross sectional shape: a more desirable cross sectional shape of light signal can be created with meta-surface to enhance resolution and pixel density of the final image rendered on the viewer's retina; for example, the beam shape of EEL (Edge-Emitting Laser) can be modified from oval to circle.

Figure 2:
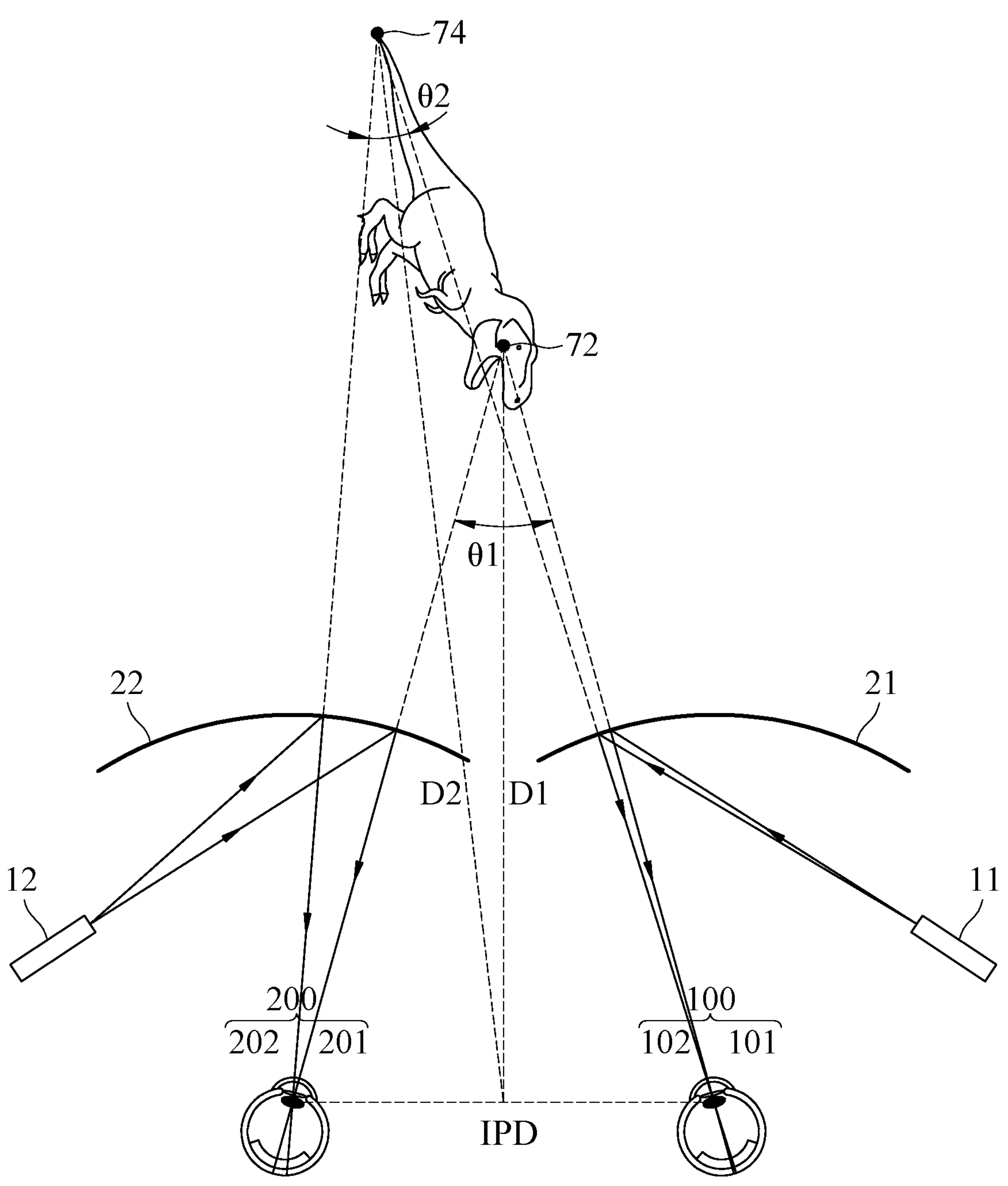
FIG. 2 illustrates the schematic of head wearable display in accordance with one embodiment of the present invention and the method for rendering a binocular virtual image.

The three dimensional (3D) meta-structure in accordance with the present invention is specially designed so it is compatible with the 3D image rendering method utilized by the head wearable display. The following described method for rendering 3D image with depth in accordance with the present invention. The key advantage of the 3D image rendering technique described herein resides in that the depth of the virtual image rendered is the same as the location both eyes of a viewer fixate, vergence-accommodation conflict (VAC) and focal rivalry can be eliminated. With reference to FIG. 2, a head wearable display has a first light emitter 11, a first optical assembly 21, a second light emitter 12, and a second optical assembly 22. In many embodiments, the optical assembly may be divided into a first optical assembly 21 and a second optical assembly 22 respectively for the two eyes of the viewer. The following use the phrase "first optical assembly 21" and the "second optical assembly 22" for describing the embodiment of the present invention for clarity. A person having ordinary skill in the art knows the two optical assembly can be integrally formed as a single one optical assembly but substantially the same in terms of function and result as the divided optical assemblies. The first light emitter 11 generates multiple first light signals 100 for an object. The first optical assembly 21 receives and redirects the multiple first light signals 100 towards one retina of a viewer to display multiple first pixels of the object. The second light emitter 12 generates multiple second light signals 200 for the object. The second optical assembly 22 receives and redirects the multiple second light signals 200 towards the other retina of the viewer to display multiple second pixels of the object. In addition, each pair of the first light signals 100 and a corresponding second light signal 200 are perceived by the viewer to display a binocular virtual pixel of a binocular virtual image with a depth that is related to an angle between the optical path extension between the first light signal 100 and the corresponding second light signal 200. The binocular virtual image is perceived with multiple depths when, in addition to a single binocular virtual pixel of the object, each of the remaining first light signals 100 and the corresponding second light signals 200 are perceived to have different depths depending on the optical path extension between each of the first light signals 100 and their corresponding second light signals 200.

Figure 3:
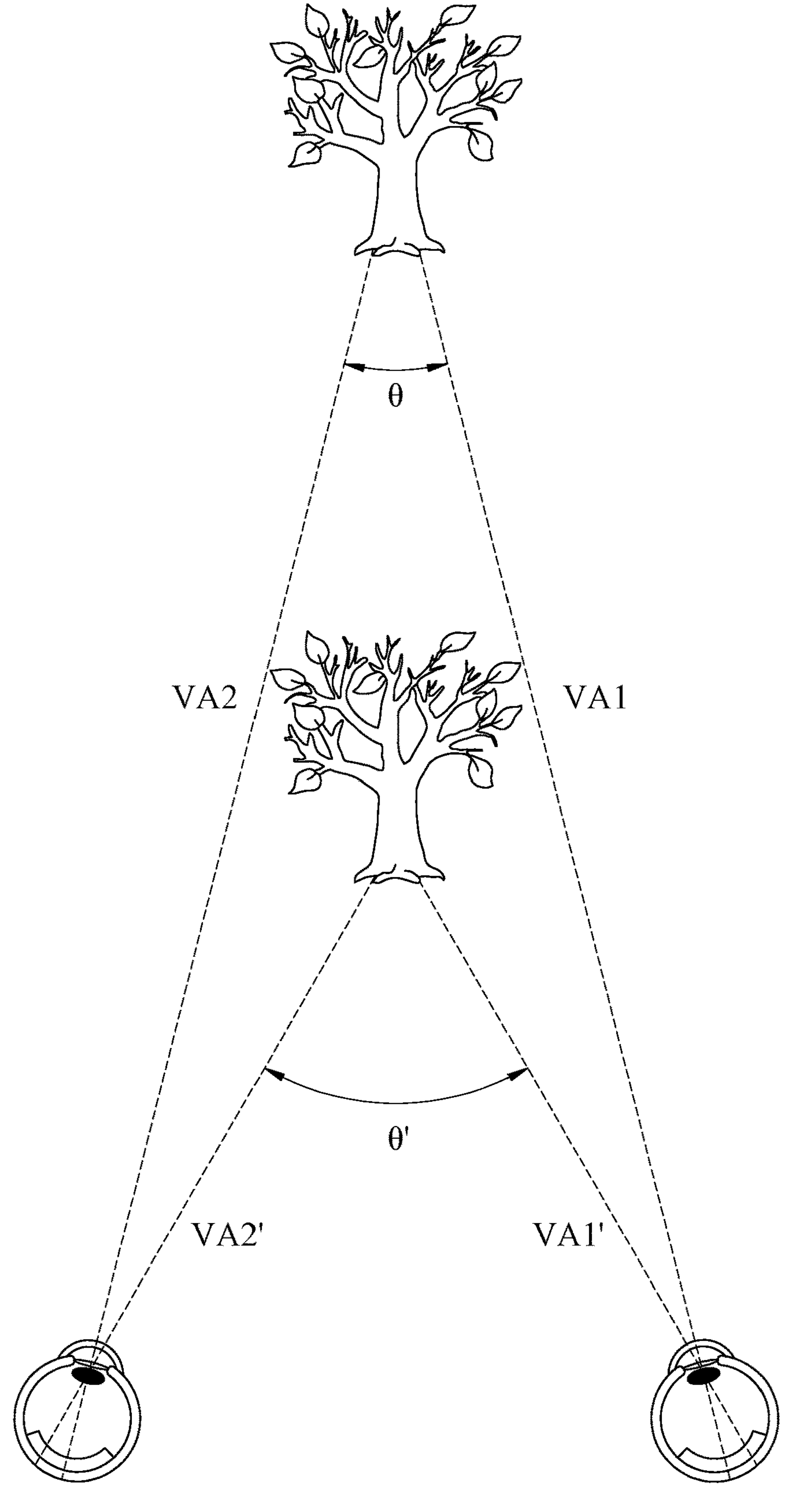
FIG. 3 illustrates the method for rendering depth perception in accordance with the present invention.

For understanding the present invention, the following describes the detailed technique for displaying a single binocular virtual pixel with depth. Furthermore, the term "optical convergent angle" refers to the angle between the incoming first light signal 100 and the second light signal 200 (which is the angle between the optical path extension of the first light signal 100 and the second light signal 200 mentioned earlier); the term "convergent angle" refers to the angle between the visual axes of the two eyes of the viewer. The location of the binocular virtual pixel perceived by the viewer can be determined by the location of intersections between an optical path of the first light signal 100 extending from the eye of the viewer toward the first optical assembly 21 and an optical path of the corresponding second light signal 200 extending from the another eye of the viewer toward the second optical assembly 22. With reference to FIG. 3, according to the nature of binocular vision, when the viewer perceives an object, the eyes of the viewer fixate at the object and the visual axes of both eyes points toward said object. The visual axis is a line extending from the viewed object through the center of the pupil to the yellow spot of the retina. The depth perception for human is partially dependent upon the convergent angle between the two visual axes of the eyes. That is to say, when the convergent angle between the two visual axes of the eyes (when fixating at an object) is relatively larger, then the object may be perceived as relatively closer to the viewer (smaller depth); on the other hand, when the convergent angle between the two visual axes of the eyes (when fixating at an object) is relatively smaller, then the object may be perceived as relatively farther away from the viewer.

By the same token, when creating binocular virtual image with head wearable displays, the optical convergent angle of the incoming first light signal 100 and the second light signal 200 relative to the viewer can be modulated to so when the viewer perceive the binocular virtual image formed by the first light signal 100 and the second light signal 200, the viewer fixates at the binocular virtual image with the desired convergent angle of the eyes, so the target depth perception can be rendered. In one embodiment, this can be achieved by letting the convergent angle of the two eyes to be the same as the optical convergent angle of between the first light signal 100 and the second light signal 200. As a result, the depth of the virtual image rendered is the same as the location both eyes of a viewer fixate, vergence-accommodation conflict (VAC) and focal rivalry can be eliminated.

Figure 4:
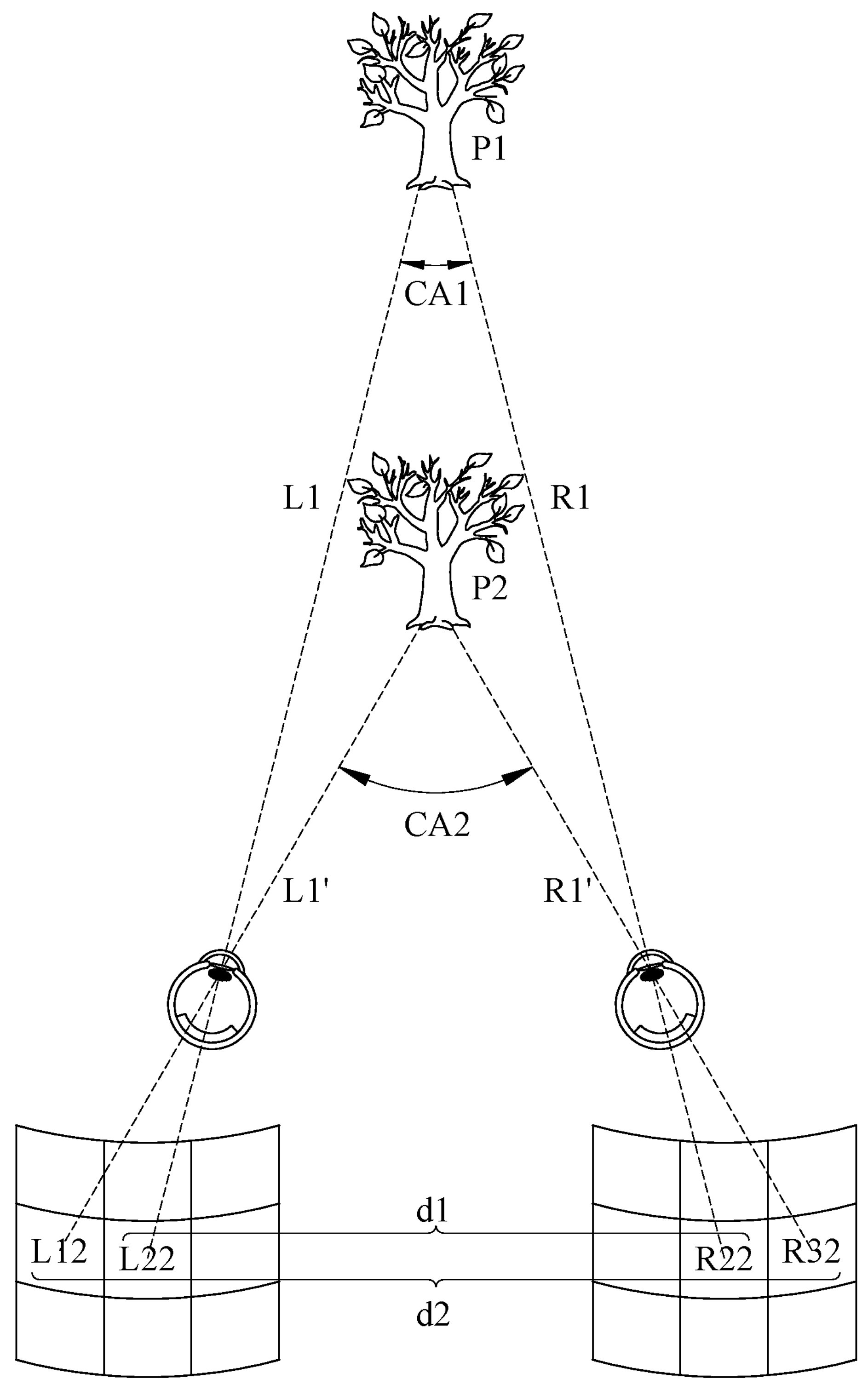
FIG. 4 illustrates the method for rendering depth perception in accordance with the present invention.

When rendering binocular virtual image using head wearable display, it is readily known that the horizontal and vertical position of a binocular virtual image in 3D space perceived by the user is directly related to the horizontal and vertical position on the first retina and the second retina where the first light signal 100 (emitted by the first emitter) and the second light signal 200 (emitted by the second emitter) are respectively emitted and received. With reference to FIG. 4, which illustrates a perception of the horizontal, vertical and depth position of an object in 3D space according to natural binocular vision of humans. For the convenience of illustrating the principle of human vision and retina scanning, the retina of the first eye and the second eye of the user are drawn as matrixes, each of the matrix elements correspond to a specific horizontal and vertical location on the retina. According to natural vision, the first right light instance R1 from the object arrives at matrix element R22 of the first retina. The corresponding second light instance L1 from the object arrives at matrix element L22 of the second retina. In addition to parallax information of the object contained in R1 and L1, the depth perception of the user is also dependent upon the optical convergent angle CA1 between the first light instance R1 and the second light instance L1. As the depth of the object perceived by the viewer increases, the optical convergent angle decreases; conversely, as the depth of the object perceived by the viewer decreases, the optical convergent angle increases. Specifically, as shown in FIG. 3, suppose the object is moved from a position p1 to p2, the optical convergent angle changes from CA1 to CA2 (with CA2>CA1); meanwhile, the location on the first retina receiving the first light instance changes from R22 to R23, and the location on the second retina receiving the second light instance changes from L22 to L12. Evidently, the depth perception of an object is at least in part related to the optical convergent angle between the first light instance and the second light instance entering the eyes of the viewer (in additional to parallax images). In natural vision, although there may be infinite number of first light instance and second light instance from a point of the object due to light scattering; however, all of the first instances and the second instances are respectively converged to a single location due to the effect of the lens of the eyes; therefore, only one instance is shown in FIG. 4.

According to the present invention, the depth perception of the binocular virtual pixel is controlled by adjusting optical convergent angle formed between the optical path extension of the first light signal 100 and the optical path extension of the second light signal 200. The direction of the optical path extension of the first light signal 100 and the second light signal 200 can be varied by controlling the direction of projection of the first light emitter 11 and the second light emitter 12. This method for creating depth perception of the virtual image is consistent with natural vision of the human eyes because human brain determines a depth of an object in 3D space at least in part based on the angle of fixation of the eye, which is directly related to the convergent angle formed between the optical path extension of the first light signal 100 and the optical path extension of the second light signal 200.

Referring back to FIG. 2, which further describes the method for rendering depth perception in accordance with the present invention. The viewer perceives a virtual image 70 composed of multiple binocular pixels (e.g., a first binocular virtual pixel 72 and a second binocular virtual pixel 74). The first binocular virtual pixel 72 is displayed at a first depth D1 and the second binocular virtual pixel 74 displayed at a second depth D2. The convergent angle of the first binocular virtual pixel 72 is θ1 (first convergent angle). The convergent angle of the second binocular virtual pixel 74 is θ2 (second convergent angle). The first depth D1 correlates to the first convergent angle θ1. In particular, the first depth of the first binocular virtual pixel of the object can be determined by the first convergent angle θ1 between the light path extensions of the first light signal 101 and the corresponding second light signal 201. The first depth D1 of the first binocular virtual pixel 72 can be calculated approximately by the following formula:

$$\tan\frac{\theta}{2} \cong \frac{IPD}{2D}$$

The distance between the right pupil and the left pupil is interpupillary distance (IPD). Similarly, the second depth D2 correlates to the second convergent angle θ2. In particular, the second depth D2 of the second binocular virtual pixel of the object can be determined approximately by the second angle θ2 between the light path extensions of the first light signal 102 and the corresponding second light signal 202 with the same formula. Since the second binocular virtual pixel 74 is perceived by the viewer to be further away from the viewer (i.e., with larger depth) than the first binocular virtual pixel 72, the second angle θ2 is smaller than the first angle θ1. In addition, the angle between a redirected right light signal and a corresponding left light signal is determined by the relative horizontal distance of the right pixel and the left pixel. Thus, the depth of a binocular virtual pixel is inversely correlated to the relative horizontal distance between the right pixel and the corresponding left pixel forming the binocular virtual pixel. In other words, the deeper a binocular virtual pixel is perceived by the viewer, the smaller the relative horizontal distance at X axis between the right pixel and left pixel forming such a binocular virtual pixel is. In some variations of the present invention, the depth perception of the binocular virtual image frame or binocular pixel may be a combination of the method aforementioned and the conventional parallax method (in part by the method disclosed in the present invention and in part by the parallax method). However, in some embodiment, the depth perception can be mainly rendered by the method disclosed in the present invention.

The above mentioned method for rendering binocular virtual pixel with depth can be applied to a varieties of display system, including laser projector based light emitters and micro LED light emitters. Each of the binocular virtual pixels in the binocular virtual image may be rendered with different depth. According to some embodiments, when the light emitter is micro LED, the head wearable display may further include collimators to cause the directions of the light signal to become more aligned in a specific direction or to cause spatial cross section of the light beam to become smaller. The optical assembly may be provided on a side of the micro LED, and the collimator may be positioned between the light emitter and the optical assembly. The collimator may be a curved mirror or lens.

The following discusses the arrangement (i.e., layout) of the meta-structures on a meta-surface for the optical assembly in accordance with the present invention. In general, the dimensions of meta-structures on a meta-surface can vary greatly, depending on the specific application and design. Meta-structures on meta-surfaces can range from nanometers to millimeters in size, and the physical dimension (e.g., length width and height) and shape of the meta-structures will determine the specific effect they have on light. For example, meta-structures in the range of a few hundred micrometers can be used to create diffraction gratings, while larger meta-structures, in the range of millimeters, can be used to manipulate light polarization. The specific size of the meta-structures is determined by the wavelength of light they are intended to interact with and the required level of control over the light. In the present invention, the Meta-structures typically have dimensions in the range of nanometers. For clarity, these meta-structures may be referred as 3D nanostructure in the present invention. The 3D nanostructure on meta-surface in accordance with the present invention is able to change the direction of incident light; the amount of directional change of the incident light is depending on the specific geometric profile of the 3D nanostructure, as well as the wavelength of the light received by the 3D nanostructure. In general the 3D nanostructure on meta-surface are pillar like structures with a varieties of cross sectional shape, such as circle, ellipse, and rectangle . . . etc. Furthermore, the height or cross sectional area of the 3D nanostructure can also affect the exiting propagation angle of the incidence light. Furthermore, according to the present invention, even with the same 3D nanostructure, light with different wavelengths can be affected differently; which means when light with different wavelengths received by the same 3D nanostructure, the amount of change in exiting angles are different (e.g., the exiting angle of the light depends upon the wavelength). In the field of head wearable display, where projection angles of the light signals are very crucial to the image quality of the final rendered virtual image, and where 3D affect is heavily depended upon the modification of the projection angle of the light signals, it is necessary to have specific and purposeful design regarding the arrangement of the 3D nanostructure for achieving the best possible image quality.

In general, head wearable display generates binocular virtual image with a plurality of binocular virtual pixels, each of the pixels has different color which is created by mixing red, green and blue light. In order to cope with different wavelengths of light that form each pixel of the binocular virtual image, the present invention proposes dividing meta-surface into a plurality of subunit sections; where each subunit section is responsible for changing the direction of a light signal forming a pixel (each pixel/light signal is composed of blue light, green light, red light, or any combination thereof) of the binocular virtual image. Therefore, for example, if the binocular virtual image created by the head wearable display comprises 1280×720 pixels, the meta-surface is divided into 1280×720 subunit sections, each of the subunit sections is responsible for receiving and redirecting each of the 1280×720 pixels respectively. Conventionally, a single set of 3D nanostructure may be used for receiving and redirecting all colors of light at once in a light signal. However, as mentioned earlier, since the resultant angle of redirection of the redirected light is heavily depended upon the wavelength of the incident light, chromatic aberration may be sever at the receiving end (e.g., the retina of the viewer) of the final rendered binocular virtual image if a uniform 3D nanostructure is used for redirecting all colors of light. To remedy this issue and to enhanced the efficiency of redirecting light with different wavelengths to the desired locations of the retina of the viewer, each of the subunit sections may be configured to comprise specific 3D nanostructure for redirecting blue light, green light, and red light contained in a single light signal (corresponding to a single pixel of the binocular virtual image) respectively. Furthermore, light with different wavelengths but belongs to the same pixel are received by a same subunit section and are redirected to a same position on the retina of the first eye of the viewer.

With reference to FIG. 5A-5E, the following discusses the layout of the subunit sections. The circle drawn in broken lines indicate the projection area (cross sectional area) of a single pixel of the light signal.

Figures 5A, 5B:
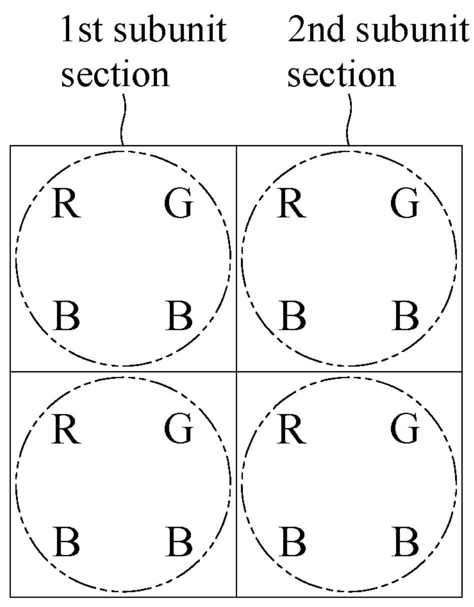
FIG. 5A illustrates a first embodiment of the layout of the meta-structure according to present invention.
FIG. 5B illustrates a second embodiment of the layout of the meta-structure according to present invention.

With reference to FIG. 5A, according to one embodiment of the present invention, the layout of the subunit sections and different areas for receiving different colors of lights are shown in the figure. In this embodiment, a cross sectional area of the light signal projected on the light redirecting layer is substantially the same as an area of one of the subunit sections. Each of the plurality of subunit sections comprises a first area B for receiving and redirecting the blue light, a second area G for receiving and redirecting the green light, or a third area R for receiving and redirecting the red light. However, upon receiving the light with different wavelengths, the first section B, the second section G, and the third section R redirect the light with different wavelengths to a same position on a retina of the first eye of the viewer. Thereby, the accurate color representation of the pixel can be reconstructed and received by the viewer. Notice that in some embodiments, two of the first area B, the second area G, and the third area R have a same horizontal position relative to the light redirecting layer, one of the first area B, the second area G, and the third area R is horizontally or vertically displaced from the other two.

With reference to FIG. 5B, in some embodiments, a single subunit section may comprise a plurality of first area B, a plurality of second area G. and a plurality of the third area R, which are distributed across the subunit section. In this embodiment, when all the colors of light in the light signal uniformly irradiate on the subunit section, they are redirected by the subunit section evenly to a specific location of the retina of the viewer. The efficiency of redirecting different colors of light may be enhanced. Furthermore, when being redirected to the retina of the viewer, the different colors of light may be blended in a more uniform manner so the original color of the pixel can be reconstructed more accurately.

Figure 5C:
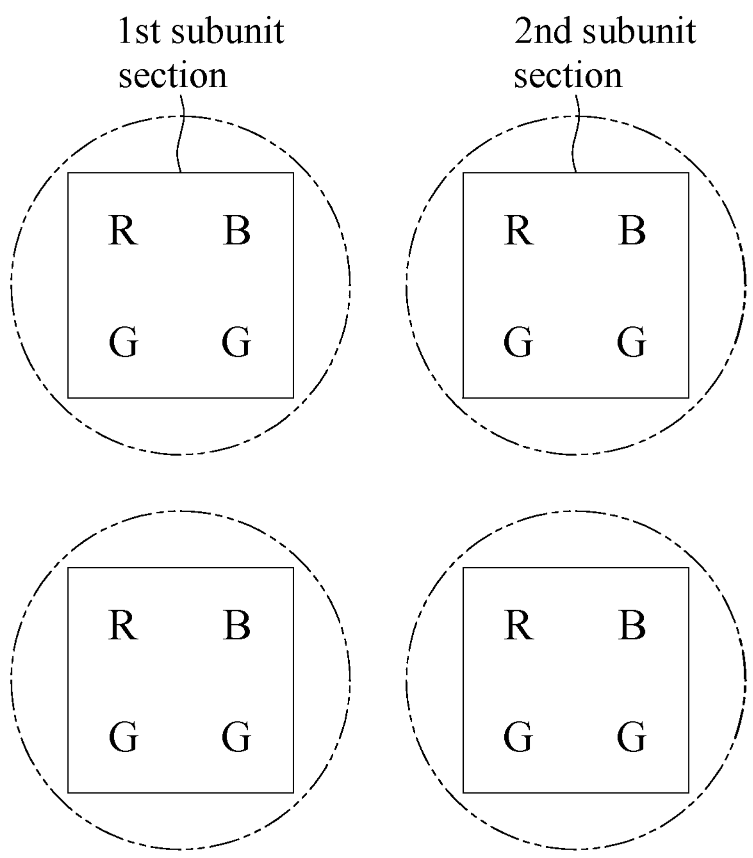
FIG. 5C illustrates a second embodiment of the layout of the meta-structure according to present invention.

With reference to FIG. 5C, according to one embodiment of the present invention, a cross sectional area of the light signal projected on the light redirecting layer may be larger than the area of one of the subunit sections. Each of the subunit sections is spaced apart from its neighboring subunit sections. Similar to the previously embodiment, the single subunit section may comprise a plurality of first area B, a plurality of second area G, and a plurality of the third area R.

Figure 5D:
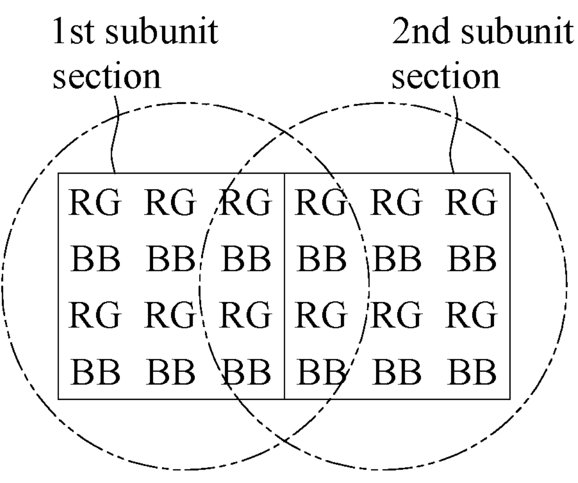
FIG. 5D illustrates a third embodiment of the layout of the meta-structure according to present invention.
Figure 5E:
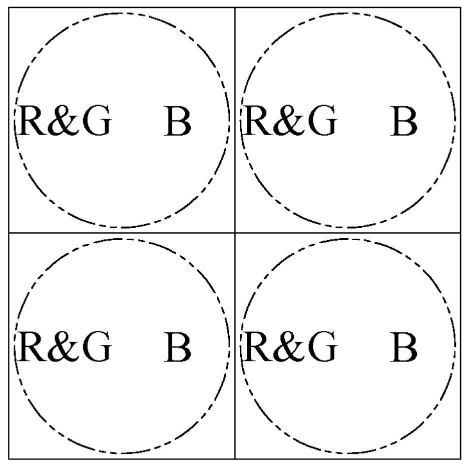
FIG. 5E illustrates a fourth embodiment of the layout of the meta-structure according to present invention.

With reference to FIG. 5D, according to one embodiment of the present invention, when the neighboring pixels of an image frame partially overlap with each other, the area on the subunit section where both adjacent light signal irradiate on may have 3D nanostructure that can redirect both adjacent light signal to their respective location on the retina. In the figure, a region (the region in the first subunit section where both pixels irradiate on) of the first subsection unit in proximity to the second neighboring subsection unit comprise three dimensional nanostructure that redirect two consecutive first signals of two pixels to their respective locations on the retina of the viewer. This embodiment may be advantageous for situation in which the cross-sectional area of the light signal of a pixel is substantially large than the area of a subunit section. With reference to the FIG. 5D, a subunit section may be sharing a same first area G, second area B. or third area R with another neighboring subunit section. As shown in the figure, a first subunit section is marked as a square and a second subunit section is marked as a square with bolded lines. Both the first subunit section and the second subunit section share the same first area G second area. In this case, the cross sectional area of the light signal projected on the light redirecting layer may be substantially the same as the area of the subunit sections. With this arrangement, the total area of the meta-surface can be reduced, which in turn reduce the manufacturing cost of the meta-surface. Similar to the previously embodiment, the single subunit section may comprise a plurality of first area B, a plurality of second area G, and a plurality of the third area R. Alternatively, in another embodiment of the present invention (with reference to FIG. 5E G), each of the plurality of subunit sections may comprise a first area R&G for receiving and redirecting two colors of light at once, and a second area B for receiving and redirecting the remaining color of light. In this embodiment, a single set of 3D nanostructure may be used for receiving two colors of light which have closer wavelengths. For example, the single set of 3D nanostructure may be used for receiving and redirecting red and green light, while a separate set of 3D nanostructure may be needed for receiving and redirecting blue light. In this manner, by reducing the number of sections for receiving different colors of light within the subunit section, the manufacturing process of the 3D nanostructure may be simplified. However, similar to the previous embodiments, upon receiving the light with different wavelengths, the first section R&G, and the second section B redirect the light with different wavelengths to a same position on a retina of the first eye of the viewer. Similar to the previously embodiment, the single subunit section may comprise a plurality of first area R&G, a plurality of second area B. Yet in another embodiment of the present invention, depending upon the need for image quality, each of the plurality of subunit sections may be designed to comprise a first area G&B for receiving and redirecting two colors of light at once, and a second area R for receiving and redirecting the remaining color of light. The first section G&B, and the second section R redirect the light with different wavelengths to a same position on a retina of the first eye of the viewer.

In the previous embodiments, the light signal emitted by the light emitter (represent a single pixel) may be uniformly received by a subunit section. In this instance, the red, green, and blue light are received uniformly by the first area, second area, and third area contained in the subunit section. In other words, all of the areas may be receiving red, green and blue light at the same time. However, since there are two are three sets of 3D nanostructure implemented in different areas of the subunit section, and each area of the subunit section are designed to redirect a specific color of light more efficiently, the different areas of the subunit section are able to redirect a specific color of light to a target location. This is different from the conventional art where a single type of nanostructure is used for changing the direction of light of all colors. In the present invention, each of the areas in the subunit section redirects the corresponding color to a target location. In general, the target location may be corresponding to a specific projection angle to render a specific depth perception of the pixel. Nonetheless, all colors redirected by different areas of the subunit sections (corresponding to a single pixel) are redirected to the same location on the retina for the viewer to perceive a pixel with a specific convergent angle.

Figures 6A, 6B:
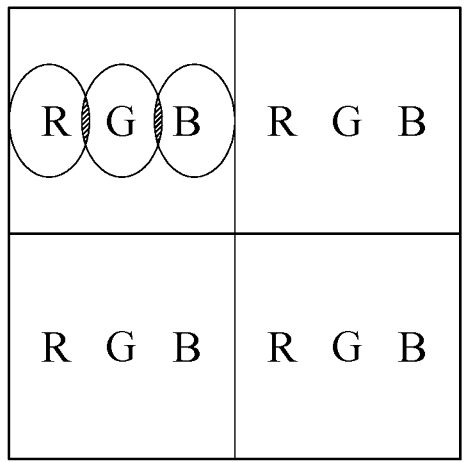
FIG. 6A illustrates a fifth embodiment of the layout of the meta-structure according to present invention.
FIG. 6B illustrates a sixth embodiment of the layout of the meta-structure according to present invention.

With reference to FIGS. 6A and 6B, in some other embodiments, each color contained in one single light signal may be respectively projected to different areas of the subunit sections. In order for different areas on the subunit section to receive the corresponding color of light, the light emitter may need to be purposely configured accordingly. For example, in the case which the light emitter is a laser projector (e.g., laser beam steering/LBS projector), the emitter may be configured to project the red, green, and blue light of forming a single pixel at different time (not concurrently). LBS projector implement MEMS mirror for altering the direction of projection; the projection angles in the vertical and horizontal direction change constantly while projecting an image frame of an image. By configuring the projector to project light with different colors at different time, light of different colors are projected to different horizontal positions or vertical positions. As a result, the blue light, the green light, or the red light are received by different areas on the subunit sections. With regard to the arrangement of the first area, the second area, or the third area of for receiving different colors of light, according to some embodiments of the present invention, the first area, the second area, or the third area have a same horizontal position relative to the light redirecting layer. In other embodiments, the first area, the second area, or the third area have a same vertical position relative to the light redirecting layer.

In the embodiment of the present invention described above, since different colors of light are received and redirected by different subunit sections, these lights are redirected toward the eye of the viewer with slightly different incident angles. However, as mentioned earlier these lights are redirected toward the same location on the retina of the eye of the viewer to render a single pixel having a specific color.

Figure 7A:
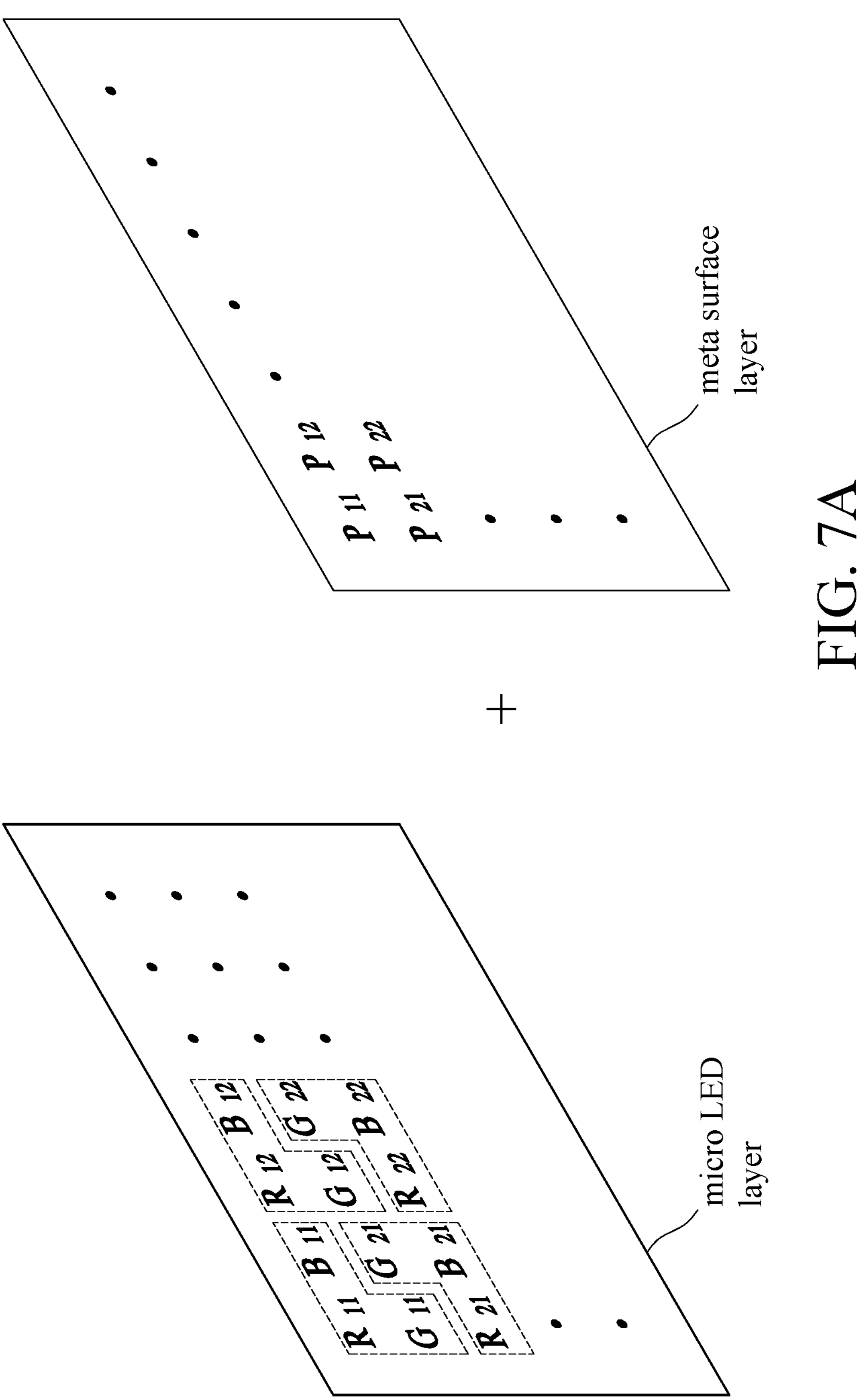
FIG. 7A illustrates a possible layout of the meta-structure for micro-LED light emitters.
Figure 7B:
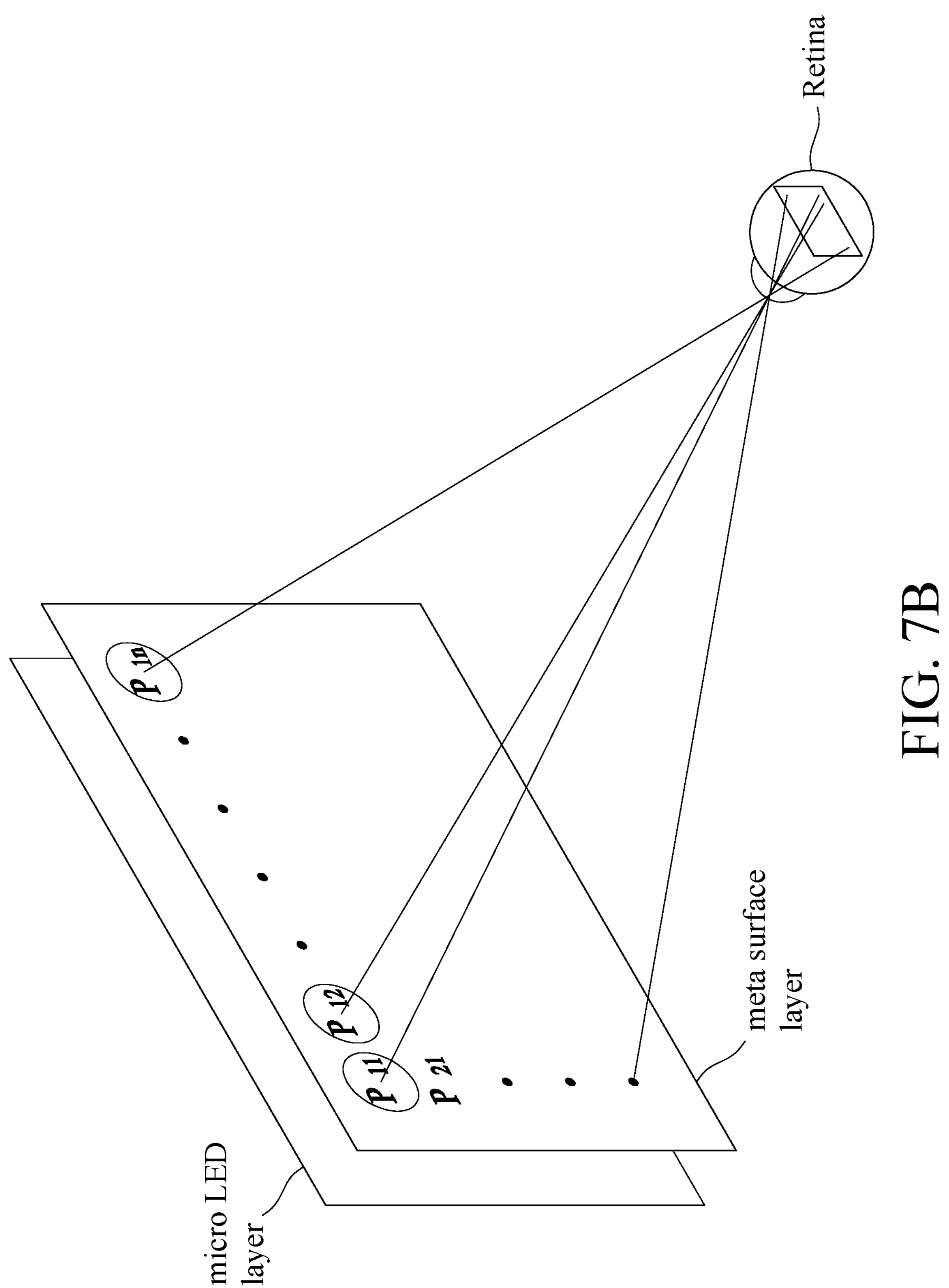
FIG. 7B is another figure illustrates the possible layout for micro-LED light emitters.

In the case which the light emitter is a micro LED, a pixel of the virtual image may by produced by a pixel unit comprising blue micro LED, green micro LED, red micro LED, or any combination thereof. A virtual image is rendered by an array of pixel unit comprising micro LEDs. The With reference to FIGS. 7A and 7B, the optical assembly may comprise meta-surface containing an array of subunit sections. Each subunit sections has a position corresponding to the position of a pixel unit. Furthermore, in some cases, the first area, second area, or the third area of the subunit sections may have position correspond to the position of the blue micro LED, green micro LED, or ed micro LED of the pixel unit. As shown in the figures, the array of pixel unit may be placed on a side of the array of subunit sections for redirecting and collimating light into the specific positions on the retina of the viewer.

In the present invention, each of the plurality of subunit sections respectively comprises the plurality of three dimensional geometric patterns with different physical dimensions for respectively receiving and redirecting light emission of different wavelengths of the light signal emitted. Although each of the subunit sections may all contain the first section, the second section, or the third section; however, the physical dimensions and shape of the first section, a second section, or a third section in different subunit section may be different. This is due to the fact that each of the subunit section need to receive light signals (represent different pixels) from different angles to different location on the retina.

One of the key features of the 3D nanostructure on the meta-surface in the present invention reside in its unique optical property relative to the conventional optical element where the Snells Law and Law of Reflection are the basic principle for all conventional optical elements. When light incidents on the 3D nanostructure on the meta-surface, the incidence angle of the light signal relative to a portion of the meta-surface receiving the light signal does not equal to the reflecting angle of the light signal relative to the portion of the meta-surface. Therefore, it is possible to design a flat optical assembly with much better performance for head wearable display (such as smart glasses), which greatly improve the form factor of the head wearable display.

To put things in perspective, the following describe an exemplary embodiment according to one scenario of the present invention. A conventional 1280×720 pixels LBS projector capable of producing red, green, and blue light may be provided. The three colors of light are coaxially projected to form the pixels of the image. Assume the FOV produced by the LBS projector is 40-degree wide, and the eye-relief (distance between eye and optical assembly) is 22 mm; then the dimension of the meta-surface on the optical assembly should be at least 16 mm (which equals 2*tan (20°)*22 mm). Therefore, the pitch between centers of two neighbor pixels (horizontal gap) projected on the meta-surface is 12.5 um (=16 mm/1280), and the difference of reflection angle to the pupil between each pixel is 0.03125° (=40°/1280). In the application of retinal scan based wearable display, the optical assembly needs to converge lights at every emission angle to the retina of the viewer. The 3D meta-structure on the meta-surface on the optical assembly redirects each light signal (representing a single pixel) of 2D image frame accurately to a specific position of the retina. Generally speaking, the diameter of each pixel on the retina is about 20-30 um. Higher VA (visual acuity) requires the smaller beam spot size (the diameter of the pixel) on the retina.

Figure 8A:
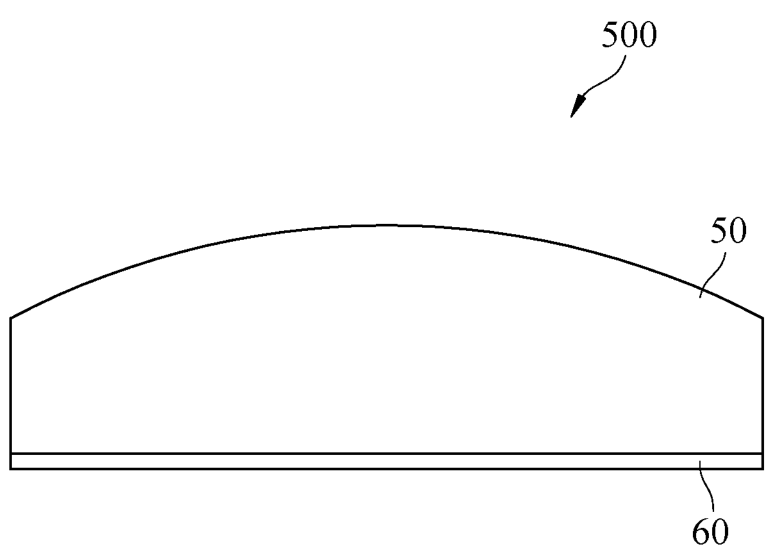
FIG. 8A is a schematic for one embodiment of the optical assembly with dioptric power.
Figure 8B:
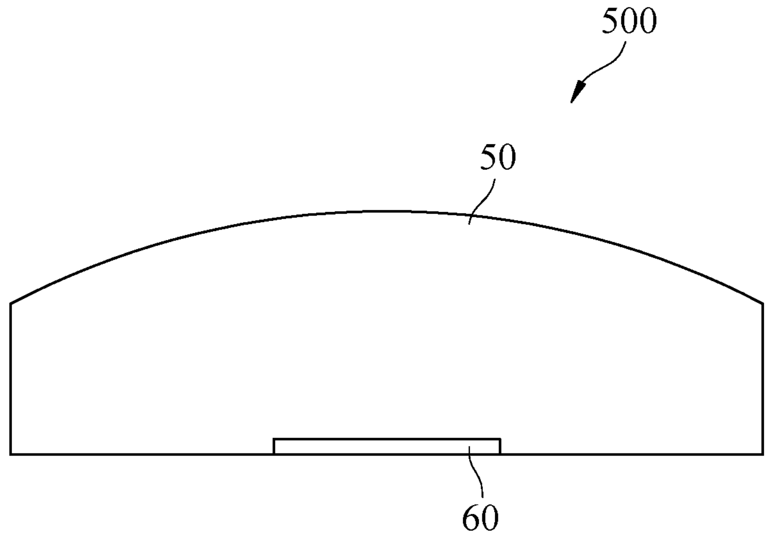
FIG. 8B is another schematic for one embodiment of the optical assembly with dioptric power.

With reference to FIGS. 8A and 8B, in some embodiments, the optical assembly 500 may be implemented with dioptric power so viewer with myopia, hyperopia, or likes may be able to see the real object in the environment. This is particularly advantageous when the optical assembly 500 is used in augmented reality or mix reality displays. Therefore, the optical assembly 500 may further comprise a dioptric surface 50 provided on a side of the optical assembly 500; and the light redirecting layer 60 is provided on another side of the dioptric surface 50. The dioptric surface 50 may comprise a convex surface or concave surface. The curvature of the dioptric surface 50 is determined based on the viewer's dioptric prescription. As an example, the prescribed curvature may be the outer surface of the optical assembly 500 (further away from the viewer's eye). The inner surface (closer to the viewer's eye) of the optical assembly 500 may be provided with light redirecting layer 60 having the meta-surface for directing the light signal to the eyes of the viewer. The curvature of the dioptric surface 50 may be aspherical lens surface or free-form surface.

Furthermore, in some embodiment, a spacer layer may be provided between the meta-surface and the optical assembly for protecting the nanostructure on the meta-surface from being damaged; or, the spacer layer provided on a side of the light redirecting layer for protecting the three dimensional nanostructure on the meta-surface.

In some embodiments, the head wearable display may include a support structure wearable on a head of the viewer to carry a first light emitter 11, a second light emitter 12, a first optical assembly 21, and a second optical assembly 22. The first optical assembly 21 and the second optical assembly 22 are positioned within a field of view of the viewer. In particular, the head wearable display may be implemented in the form of a pair of glasses, which is referred to as smart glasses. In this situation, the optical assembly may be incorporated with prescription lenses used to correct nearsightedness, farsightedness, etc. In some instances, when the head wearable display is implemented on smart eyeglasses, the optical assembly of the smart eyeglasses may have both dioptric property for correcting the viewer's eyesight and the function of a combiner. The smart eyeglasses may have optical assembly with prescribed dioptric property to fit the need of individuals are near-sighted or far-sighted to correct their eyesight. In these circumstances, the optical assembly (the optical assembly may also be divided into two and provided independently for the two eyes) of the smart eyeglasses may comprise a dioptric surface 50. The dioptric surface 50 and optical assembly can be integrally manufactured as one piece with the same or different type of material. The dioptric surface 50 and the optical assembly can also be separately manufactured in two pieces and then assembled together. In some instances, the light redirecting layer is provided on a side of the optical assembly; and the dioptric surface 50 is provided on a side of the optical assembly that is opposite to the side which the light redirecting is provided, as shown in FIGS. 8A and 8B. For example, the light redirecting layer may be on the inner side of the optical assembly (closer to the eyes) and the dioptric surface 50 may be on the outer side of the optical assembly.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded the widest scope consistent with the principles and novel features disclosed herein. It is contemplated that additional embodiments are within the spirit and true scope of the disclosed subject matter. Thus, it is intended that the present invention covers modifications and variations that come within the scope of the appended claims and their equivalents.

What is claimed is:

1. An optical assembly for head wearable display comprising:

a light redirecting layer, being provided in a first optical path between a first light emitter and a first eye of a viewer, the light redirecting layer comprising a plurality of three dimensional geometric patterns provided on one surface of the light redirecting layer;

wherein the light redirecting layer comprises a plurality of subunit sections, each of the plurality of subunit sections respectively comprises the plurality of three dimensional geometric patterns with different physical dimensions for respectively receiving and redirecting light emission of different wavelengths of a plurality of first light signals emitted by the first light emitter toward the first eye of the viewer with different incident angles, each of the first light signals corresponds to a first pixel of an image respectively, wherein another light redirecting layer is provided in a second optical path between a second light emitter and a second eye of the viewer for respectively receiving and redirecting light emission of different wavelengths of a plurality of second light signals emitted by the second light emitter toward the second eye of the viewer with different incident angles, each of the second light signals corresponds to a second pixel of the image respectively, wherein the different incident angles of the first light signals relate to visual axes of the first eye when perceiving the first pixels, the different incident angles of the second light signals relate to visual axes of the second eye when perceiving the second pixels, the viewer perceives one of the first pixels and a corresponding second pixel to form a binocular pixel of the image, wherein the plurality of three dimensional geometric patterns comprise pillar like three dimensional nanostructure protruding from a surface of the light redirecting layer.

2. The optical assembly for head wearable display of claim 1, wherein the first light emitter is configured to emit at least a blue light, a green light, a red light, or any combination thereof, each of the plurality of subunit sections are configured for respectively receiving the first light signals composed of any combination of the blue light, the green light or the red light and redirecting any combination of the blue light, the green light or the red light toward the first eye of the viewer with different incident angles.

3. The optical assembly for head wearable display of claim 2, wherein the blue light, the green light, or the red light are received by a same location on the subunit sections.

4. The optical assembly for head wearable display of claim 2, wherein the blue light, the green light, or the red light are received by different locations on the subunit sections.

5. The optical assembly for head wearable display of claim 2, wherein the blue light, the green light, or the red light forming each of the first light signals are not emitted concurrently.

6. The optical assembly for head wearable display of claim 2, each of the plurality of subunit sections further comprising a first area for receiving and redirecting the blue light, a second area for receiving and redirecting the green light, or a third area for receiving and redirecting the red light.

7. The optical assembly for head wearable display of claim 6, wherein two of the first area, the second area, and the third area have a same horizontal or vertical position relative to the light redirecting layer, one of the first area, the second area, and the third area is horizontally or vertically displaced from the two of the first area, the second area, and the third area.

8. The optical assembly for head wearable display of claim 1, wherein an incidence angle of any one of the first light signals relative to a portion of the light redirecting layer receiving the first light signal does not equal to a reflecting angle of the first light signal relative to the portion of the light redirecting layer.

9. The optical assembly for head wearable display of claim 1, wherein a cross sectional area of the first light signals projected on the light redirecting layer is substantially the same as an area of one of the subunit sections.

10. The optical assembly for head wearable display of claim 9, wherein light of different wavelengths in a first light signal received by a same subunit section in the plurality subunit sections is redirected to a same position on a retina of the first eye of the viewer.

11. The optical assembly for head wearable display of claim 1, wherein the first light emitter is a micro light emitting diode, the optical assembly is provided on a side of the first light emitter.

12. The optical assembly for head wearable display of claim 11, wherein the first light signals are collimated by the light redirecting layer after passing through the light redirecting layer.

13. The optical assembly for head wearable display of claim 1, wherein the light redirecting layer is provided on one side of the optical assembly.

14. The optical assembly for head wearable display of claim 1, wherein the optical assembly is configured for receiving the first light signal emitted by the first light emitter and traveling through a light direction modifier for dynamically changing a direction of the first light signal with respect to time.

15. The optical assembly for head wearable display of claim 1, further comprising a spacer layer provided on a side of the light redirecting layer for protecting the three dimensional nanostructure on the meta-surface.

16. The optical assembly for head wearable display of claim 1, wherein a region of a subsection unit in proximity to a neighboring subsection unit comprise three dimensional nanostructure that redirect two consecutive first signals of two pixels to their respective locations on the retina of the viewer.

17. The optical assembly for head wearable display of claim 1, further comprising a dioptric surface provided on a side of the optical assembly.

18. The optical assembly for head wearable display of claim 17, wherein the dioptric surface comprises a convex surface or concave surface.

19. The optical assembly for head wearable display of claim 17, wherein the light redirecting layer is provided on a side of the dioptric surface.

* * * * *